US012211421B2

(12) United States Patent
Marsh-Croft et al.

(10) Patent No.: US 12,211,421 B2
(45) Date of Patent: Jan. 28, 2025

(54) DISPLAY ASSEMBLY WITH A DOT MATRIX AND PICTOGRAPHIC ELEMENTS

(71) Applicant: Breville Pty Limited, Alexandria (AU)

(72) Inventors: Byron Ashley Marsh-Croft, Alexandria (AU); Jonathan Woodcock, Alexandria (AU); Caroline Valentina Vasta, Alexandria (AU); Tibor Hegedis, Alexandria (AU); Richard Hoare, Alexandria (AU)

(73) Assignee: Breville Pty Limited, Alexandria (AU)

(*) Notice: Subject to any disclaimer, the term of this patent is extended or adjusted under 35 U.S.C. 154(b) by 0 days.

(21) Appl. No.: 17/640,566

(22) PCT Filed: Sep. 7, 2020

(86) PCT No.: PCT/AU2020/050940
§ 371 (c)(1),
(2) Date: Mar. 4, 2022

(87) PCT Pub. No.: WO2021/042177
PCT Pub. Date: Mar. 11, 2021

(65) Prior Publication Data

US 2022/0343830 A1 Oct. 27, 2022

(30) Foreign Application Priority Data

Sep. 6, 2019 (AU) ................................ 2019903309

(51) Int. Cl.
*G09G 3/36* (2006.01)
*G09G 3/20* (2006.01)

(52) U.S. Cl.
CPC ......... *G09G 3/2096* (2013.01); *G09G 3/3611* (2013.01); *G09G 2354/00* (2013.01)

(58) Field of Classification Search
CPC ............................ G09G 3/2096; G09G 3/361
See application file for complete search history.

(56) References Cited

U.S. PATENT DOCUMENTS 6,201,529 B1 3/2001 Shimizu
9,191,998 B2 11/2015 Hegedis et al.
(Continued)

FOREIGN PATENT DOCUMENTS

CN 1800928 A 7/2006
CN 101329544 A 12/2008
(Continued)

OTHER PUBLICATIONS

ASKO—Instructions for use Combi Microwave Oven OCM8478G/BO4CM4T2-42, Version 1, May 18, 2015, [online], [retrieved from the Internet on Oct. 20, 2020], <URL: https://www.winningappliances.com.au/public/manuals/Asko-OCM8478G-Electric-Combi-Wall-Microwave-Oven-User-Manual.pdf>.
(Continued)

*Primary Examiner* — Roy P Rabindranath
(74) *Attorney, Agent, or Firm* — KDW FIRM PLLC

(57) ABSTRACT

A display assembly (201) for a kitchen device (100), the display assembly (201) including: a liquid crystal display panel (214) having a plurality of liquid crystal elements (300) forming a dot matrix (302); a memory device (225) for storing executable instructions for operating the dot matrix (302); a processor (202) adapted to execute the executable instructions to: determine a required output of the dot matrix (302); retrieve a predetermined instruction set from the memory device (225) that corresponds to the required output; and operate the dot matrix (302) using the predetermined instruction set, wherein the predetermined instruction set includes an instruction for each element (300) in the plurality of liquid crystal elements (300).

13 Claims, 7 Drawing Sheets

(56) References Cited

U.S. PATENT DOCUMENTS

| | | | | |
|---|---|---|---|---|
| 2003/0031016 | A1* | 2/2003 | Berthold | F24C 7/082 362/253 |
| 2008/0126024 | A1 | 5/2008 | Gottsman | |
| 2009/0001181 | A1 | 1/2009 | Siddaramanna et al. | |
| 2010/0107110 | A1 | 4/2010 | Mirza et al. | |
| 2013/0263034 | A1 | 10/2013 | Bruck et al. | |
| 2014/0103349 | A1* | 4/2014 | Yu | H01L 29/78651 438/34 |
| 2015/0289324 | A1 | 10/2015 | Rober | |
| 2016/0174748 | A1 | 6/2016 | Baldwin | |
| 2016/0180789 | A1* | 6/2016 | Hur | G09G 3/3614 345/100 |
| 2018/0255971 | A1 | 9/2018 | Moon | |
| 2019/0107305 | A1 | 4/2019 | Bruck et al. | |
| 2021/0035463 | A1* | 2/2021 | Drake | G09B 5/06 |

FOREIGN PATENT DOCUMENTS

| | | | |
|---|---|---|---|
| CN | 102414601 | A | 4/2012 |
| CN | 106708181 | A | 5/2017 |
| CN | 206543138 | U | 10/2017 |
| CN | 107393501 | A | 11/2017 |
| CN | 109106231 | A | 1/2019 |
| CN | 109167871 | A | 1/2019 |
| JP | 857164228 | A | 10/1982 |
| JP | 2008110220 | A | 5/2008 |
| JP | 2017169645 | A | 9/2017 |
| RU | 2567701 | C2 | 11/2015 |
| RU | 2654907 | C2 | 5/2018 |
| WO | 2012174595 | | 12/2012 |

OTHER PUBLICATIONS

International Search Report for application No. PCT/AU2020/050940, date of mailing Oct. 28, 2020.

* cited by examiner

DISPLAY ASSEMBLY WITH A DOT MATRIX AND PICTOGRAPHIC ELEMENTS

CROSS-REFERENCE TO RELATED APPLICATIONS

This application is a national stage application filed under 35 U.S.C. 371 claiming the benefit of and priority to international patent application no. PCT/AU2020/050940, filed Sep. 7, 2020, which also claims priority to Australian national patent application No. 2019903309, filed on Sep. 6, 2019, the entirety of which both applications are incorporated by reference in their entireties.

FIELD

This invention relates to a display assembly for a kitchen device.

BACKGROUND

Frequently, kitchen devices are equipped with a liquid crystal display (LCD) panel to provide users with information about a cooking process or the state of the kitchen device. For instance, microwaves and ovens have such LCD panels to display a time remaining in the cooking process. However, the quantity of information provided at any time, and the total diversity of possible information that is providable using the LCD panel is limited. This is because a limited amount of available front facing surface of the kitchen device is typically a constraint to large LCD panels. The kitchen device is typically designed to have the smallest form factor possible, to be stored, moved, and used more conveniently in a kitchen environment.

A known approach to solve the problem of limited information diversity and quantity is to use pictographic elements. Typically, pictographic elements can provide more information in a given space compared to text. For example, the common icon for “thawing” on toasters occupies much less space compared to the word “thawing”. Typically, each pictographic element is implemented as a single liquid crystal element on the LCD panel.

However, due to cultural differences, overuse of pictographic elements, or simply bad design can cause a user to be confused between several pictographic elements, misunderstand pictographic elements, and leads to a poor user experience, as well as safety concerns.

A second problem encountered by designers of kitchen devices is that each element has only two states: on and off. The shape of each element is fixed at manufacture, thus there is a lack of flexibility in providing a variety of information. Implementing too many liquid crystal elements in an LCD panel undesirably increases cost of the LCD panel, while only providing a linear return in diversity of providable information (each additional element only provides a single further piece of providable information). Lastly, in LCD panels that rely solely on pictographic elements, the localisation cost, that is, the cost to implement local languages, can be a considerable expense. Additionally, each kitchen device is locked to the localisation it is initially manufactured for, as the text-character pictographic elements cannot easily be altered after manufacture.

SUMMARY OF INVENTION

It is an object of the present invention to address one or more of the above problems, or at least provide a useful alternative to the above discussed kitchen devices.

In a first aspect, the present invention provides a display assembly for a kitchen device, the display assembly including:

- a liquid crystal display panel having a plurality of liquid crystal elements forming a dot matrix;
- a memory device for storing executable instructions for operating the dot matrix;
- a processor adapted to execute the executable instructions to:
  - determine a required output of the dot matrix;
  - retrieve a predetermined instruction set from the memory device that corresponds to the required output; and
  - operate the dot matrix using the predetermined instruction set, wherein the predetermined instruction set includes an instruction for each element in the plurality of liquid crystal elements.

Preferably, the display assembly further including:

- a liquid crystal pictographic element; and
- a user input device to select the pictographic element, wherein the processor is adapted to associate the pictographic element with a corresponding output of the dot matrix such that, when the pictographic element is selected using the user input device, the processor determines the required output of the dot matrix from the corresponding output.

Preferably, the pictographic element is associatable with a plurality of possible corresponding outputs, and wherein the processor is adapted to associate the pictographic element with the corresponding output from the plurality of possible corresponding outputs on the basis of a geographic location of the kitchen device or a user selection.

Preferably, the processor is adapted to receive the geographic location and/or the user selection by communicating with a personal computing device.

Preferably, the liquid crystal display panel further has:

- a second plurality of liquid crystal elements forming a second dot matrix;

wherein the executable instructions also include executable instruction for operating the second dot matrix and the processor is adapted to execute the executable instructions to:

- associate the required output of the dot matrix with a second required output of the second dot matrix;
- determine the second required output of the second dot matrix on the basis of the required output of the dot matrix;
- retrieve the predetermined instruction set from the memory device that corresponds to the second required output; and
- operate the second dot matrix using the predetermined instruction set that corresponds to the second required output.

Preferably, the processor is adapted to retrieve the predetermined set of instructions from the memory device in a single operation for operation of the dot matrix using the predetermined set of instructions, and

- wherein the operation of the dot matrix using the predetermined set of instructions operates each liquid crystal element substantially simultaneously.

In a second aspect, the present invention provides a kitchen device having the display assembly of the first aspect.

In a third aspect, the present invention provides a method of operating a display assembly of a kitchen device having a plurality of liquid crystal elements forming a dot matrix, the method including the steps of:

determining a required output of the dot matrix;

retrieving a predetermined instruction set from a memory device of the kitchen device that corresponds to the required output; and operating the dot matrix using the predetermined instruction set, wherein the predetermined instruction set includes an instruction for each element in the plurality of liquid crystal elements.

Preferably, the display assembly further includes a liquid crystal pictographic element and a user input device, and the method further including the steps of:

associating the pictographic element with a corresponding output of the dot matrix; and when the pictographic element is selected using the user input device, determining the required output of the dot matrix from the corresponding output.

Preferably, the pictographic element is associatable with a plurality of possible corresponding outputs, and the method further including the step of:

associating the pictographic element with the corresponding output from the plurality of possible corresponding outputs on the basis of a geographic location of the kitchen device or a user selection Preferably, the method further including the step of:

receiving the geographic location and/or the user selection by communicating with a personal computing device.

Preferably, the kitchen device further includes a second plurality of liquid crystal elements forming a second dot matrix, and the method further including the steps of:

associating the required output of the dot matrix with a second required output of the second dot matrix;

determining the second required output of the second dot matrix on the basis of the required output of the dot matrix;

retrieving the predetermined instruction set from the memory device that corresponds to the second required output; and operating the second dot matrix using the predetermined instruction set.

In a fourth aspect, the present invention provides a programmable memory device containing executable instructions to carry out the method of the third aspect.

BRIEF DESCRIPTION OF DRAWINGS

Preferred embodiments of the present invention will now be described, by way of examples only, with reference to the accompanying drawings.

DESCRIPTION OF EMBODIMENTS

Figure 1:
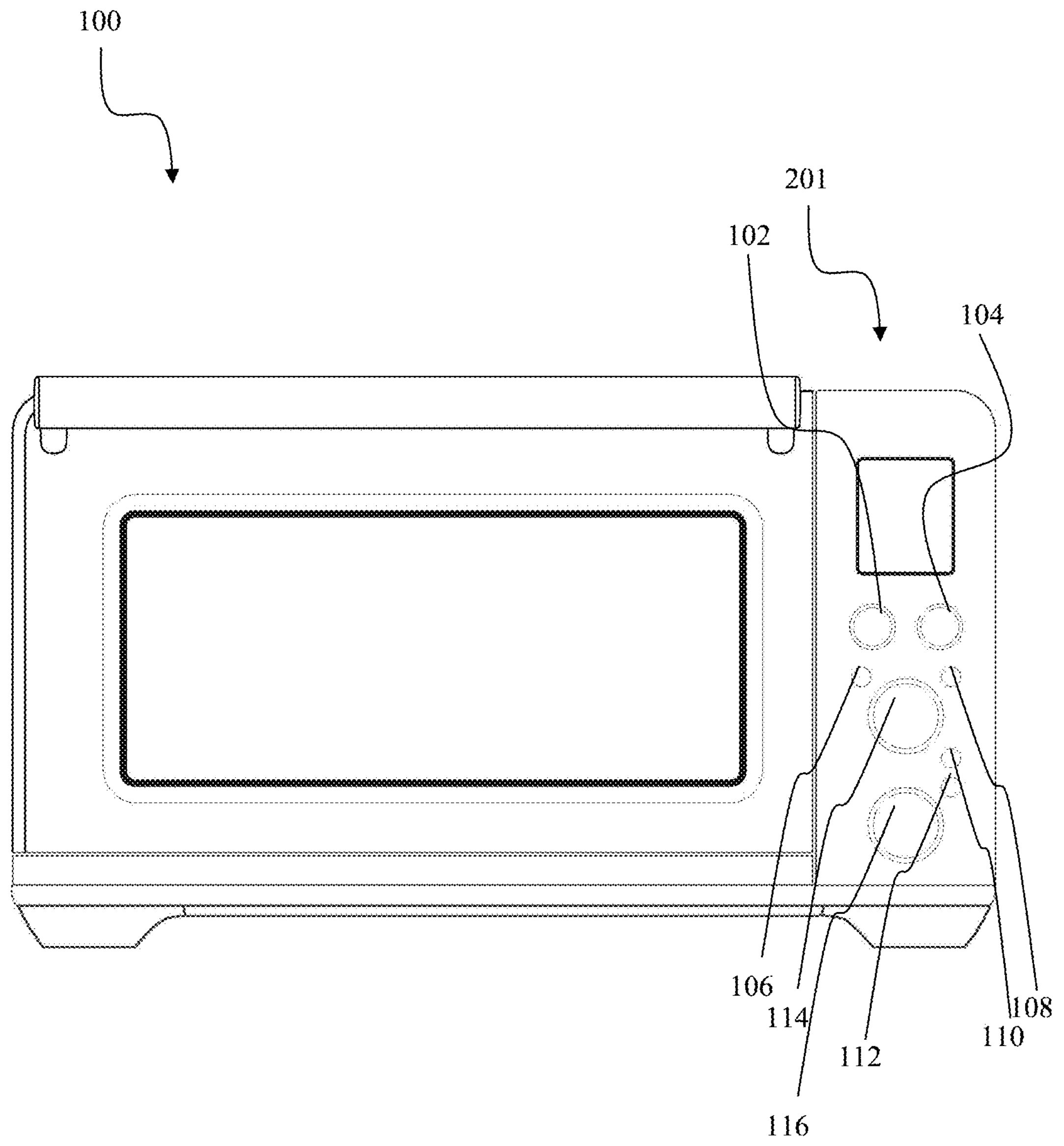
FIG. 1 is a front view of a kitchen device having a display assembly according to a preferred embodiment of the invention.

FIG. 1 shows a kitchen device 100 having a display assembly 201 according to a preferred embodiment of the invention.

Figure 2A:
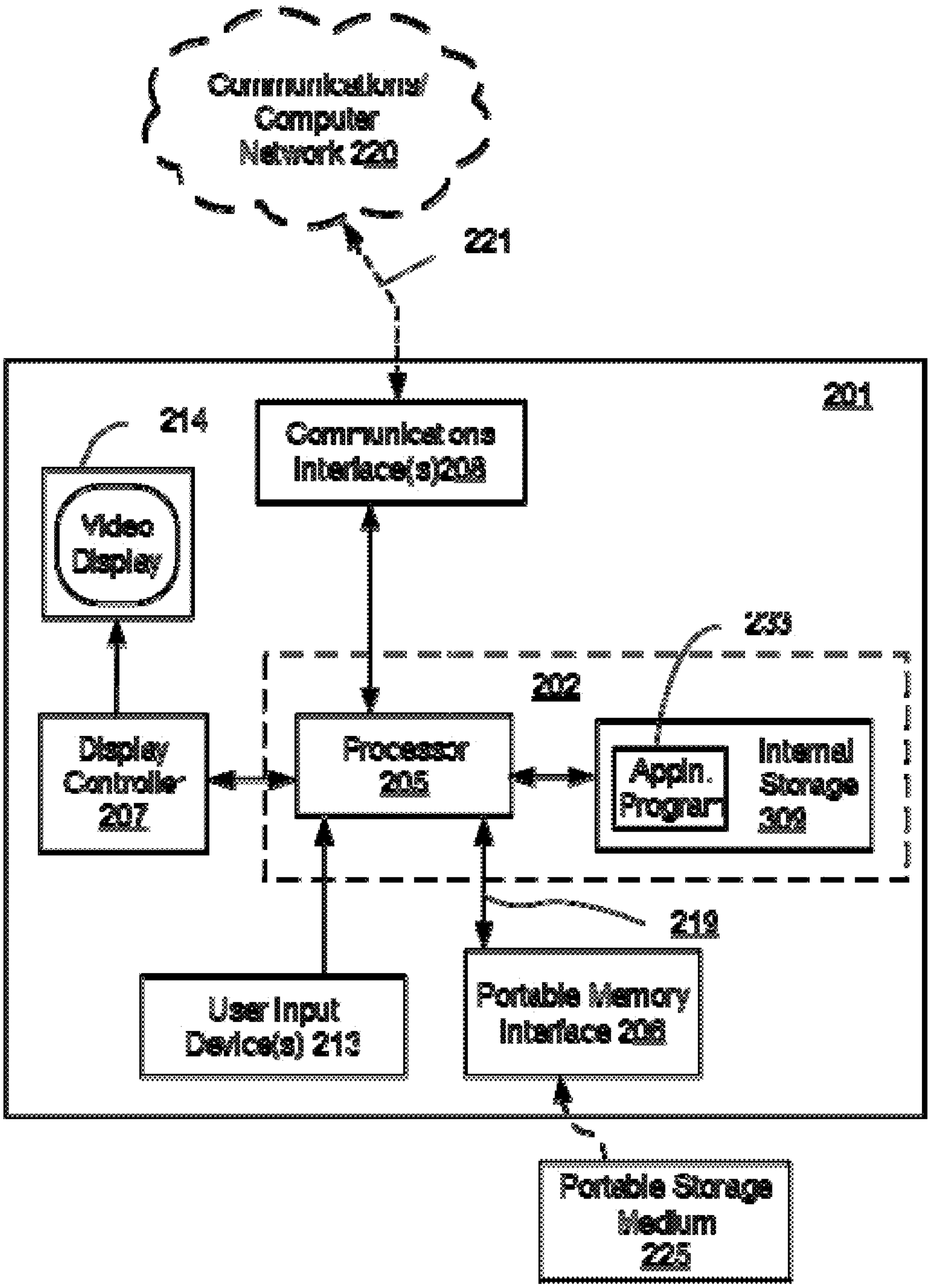
FIG. 2A is a schematic block diagram of the display assembly of FIG. 1.
Figure 2B:
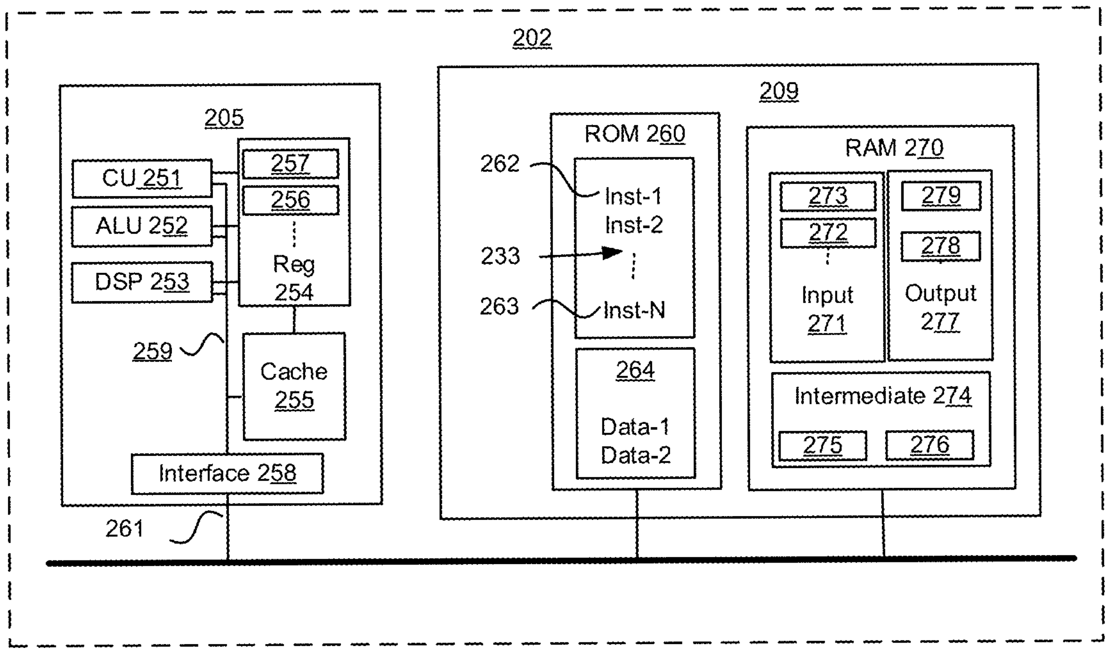
FIG. 2B is a schematic block diagram of the display assembly of FIG. 1.

FIGS. 2A and 2B collectively form a schematic block diagram of the display assembly 201 including embedded components. As seen in FIG. 2A, the display assembly 201 comprises a processor 202, preferably an embedded controller 202. Accordingly, the display assembly 201 may be referred to as an "embedded device." In the present example, the controller 202 has a processing unit (or processor) 205 which is bi-directionally coupled to an internal storage module 209, as seen in FIG. 2B. The storage module 209 may be formed from non-volatile semiconductor read only memory (ROM) 260 and semiconductor random access memory (RAM) 270, as seen in FIG. 2B. The RAM 270 may be volatile, non-volatile or a combination of volatile and non-volatile memory.

The display assembly 201 includes a display controller 207, which is connected to a video display 214, such as a liquid crystal display (LCD) panel or the like. The display controller 207 is configured for operating the video display 214 in accordance with a display instruction set received from the embedded controller 202, to which the display controller 207 is connected.

The display assembly 201 also includes user input devices 213 which are typically formed by keys, a keypad or like controls. In some implementations, the user input devices 213 may include a touch sensitive panel physically associated with the display 214 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus. As seen in FIG. 1, the preferred embodiment of the invention includes a plurality of buttons 102, 104, 106, 108, 110, 112, as well as two rotary selectors 114, 116.

As seen in FIG. 2A, the display assembly 201 may also comprise a portable memory interface 206, which is coupled to the processor 205 via a connection 219. The portable memory interface 206 allows a complementary portable memory device 225 to be coupled to the display assembly 201 to act as a source or destination of data or to supplement the internal storage module 209. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The display assembly 201 also has a communications interface 208 to permit coupling of the display assembly 201 to a computer or communications network 220 via a connection 221. The connection 221 may be wired or wireless. For example, the connection 221 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Various systems and/or methods described hereinafter may be implemented using the embedded controller 202 as one or more software application programs 233 including executable instructions, executable within the embedded controller 202. The display assembly 201 of FIG. 2A implements the described systems and/or methods. In particular, with reference to FIG. 2B, the steps of the described methods are effected by executable instructions in the software application programs 223 that are carried out within the controller 202. The executable instructions may be formed as one or more code modules, each for performing one or more particular tasks. The executable instructions may also be divided into two separate parts, in which a first part and the corresponding code modules performs the described methods and a second part and the corresponding code modules manage a user interface between the first part and the user.

The software application programs 223 of the embedded controller 202 are typically stored in the non-volatile ROM 260 of the internal storage module 209. The software application programs 223 stored in the ROM 260 can be updated when required from a computer readable medium. The software application programs 223 can be loaded into and executed by the processor 205. In some instances, the processor 205 may execute executable instructions that are located in RAM 270. Executable instructions may be loaded into the RAM 270 by the processor 205 initiating a copy of one or more code modules from ROM 260 into RAM 270. Alternatively, the executable instructions of one or more code modules may be pre-installed in a non-volatile region of RAM 270 by a manufacturer. After one or more code modules have been located in RAM 270, the processor 205 may execute executable instructions of the one or more code modules.

The software application programs 223 are typically pre-installed and stored in the ROM 260 by a manufacturer, prior to distribution of the display assembly 201. However, in some instances, the software application programs 223 may be supplied to the user encoded on one or more portable memory devices (not shown) and read via the portable memory interface 206 of FIG. 2A prior to storage in the internal storage module 209 or in the portable memory 225. In another alternative, the software application programs 223 may be read by the processor 205 from the network 220, or loaded into the controller 202 or the portable storage medium 225 from other computer readable media. Computer readable storage media refers to any non-transitory tangible storage medium that participates in providing instructions and/or data to the controller 202 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the display assembly 201. Examples of transitory or non-tangible computer readable transmission media that may also participate in the provision of software, application programs, instructions and/or data to the device 201 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the software application programs 223 and the corresponding code modules mentioned above may be executed to implement one or more graphical user interfaces (GUIs) to be output on the display 214 of FIG. 2A. Through manipulation of the user input devices 213 (e.g., the keypad), a user of the device 201 and the software application programs 223 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 2B illustrates in detail the embedded controller 202 having the processor 205 for executing the client application 10 and the internal storage 209. The internal storage 209 comprises read only memory (ROM) 260 and random access memory (RAM) 270. The processor 205 is able to execute the software application programs 223 stored in one or both of the connected memories 260 and 270. When the electronic device 201 is initially powered up, a system program resident in the ROM 260 is executed. The application program 233 that is permanently stored in the ROM 260 is sometimes referred to as "firmware". Execution of the firmware by the processor 205 may fulfil various functions, including processor management, memory management, device management, and storage management.

The processor 205 typically includes a number of functional modules including a control unit (CU) 251, an arithmetic logic unit (ALU) 252, a digital signal processor (DSP) 253 and a local or internal memory comprising a set of registers 254 which typically contain atomic data elements 256, 257, along with internal buffer or cache memory 255. One or more internal buses 259 interconnect these functional modules. The processor 205 typically also has one or more interfaces 258 for communicating with external devices via system bus 281, using a connection 261.

The software application programs 223 include a sequence of instructions 262 through 263 that may include conditional branch and loop instructions. The application program 233 may also include data, which is used in execution of the software application programs 223. This data may be stored as part of the instruction or in a separate location 264 within the ROM 260 or RAM 270.

In general, the processor 205 is given a set of instructions, which are executed therein. This set of instructions may be organised into blocks, which perform specific tasks or handle specific events that occur in the display assembly 201. Typically, the software application programs 223 waits for events and subsequently executes the block of code associated with that event. Events may be triggered in response to input from a user, via the user input devices 213 of FIG. 2A, as detected by the processor 205. Events may also be triggered in response to other sensors and interfaces in the display assembly 201.

The execution of a set of the executable instructions may require numeric variables to be read and modified. Such numeric variables are stored in the RAM 270. The disclosed method uses input variables 271 that are stored in known locations 272, 273 in the memory 270. The input variables 271 are processed to produce output variables 277 that are stored in known locations 278, 279 in the memory 270. Intermediate variables 274 may be stored in additional memory locations in locations 275, 276 of the memory 270. Alternatively, some intermediate variables may only exist in the registers 254 of the processor 205.

The execution of a sequence of instructions is achieved in the processor 205 by repeated application of a fetch-execute cycle. The control unit 251 of the processor 205 maintains a register called the program counter, which contains the address in ROM 260 or RAM 270 of the next instruction to be executed. At the start of the fetch execute cycle, the contents of the memory address indexed by the program counter is loaded into the control unit 251. The instruction thus loaded controls the subsequent operation of the processor 205, causing for example, data to be loaded from ROM memory 260 into processor registers 254, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the software application programs 223, and is performed by repeated execution of a fetch-execute cycle in the processor 205 or similar programmatic operation of other independent processor blocks in the display assembly 201.

Figure 3:
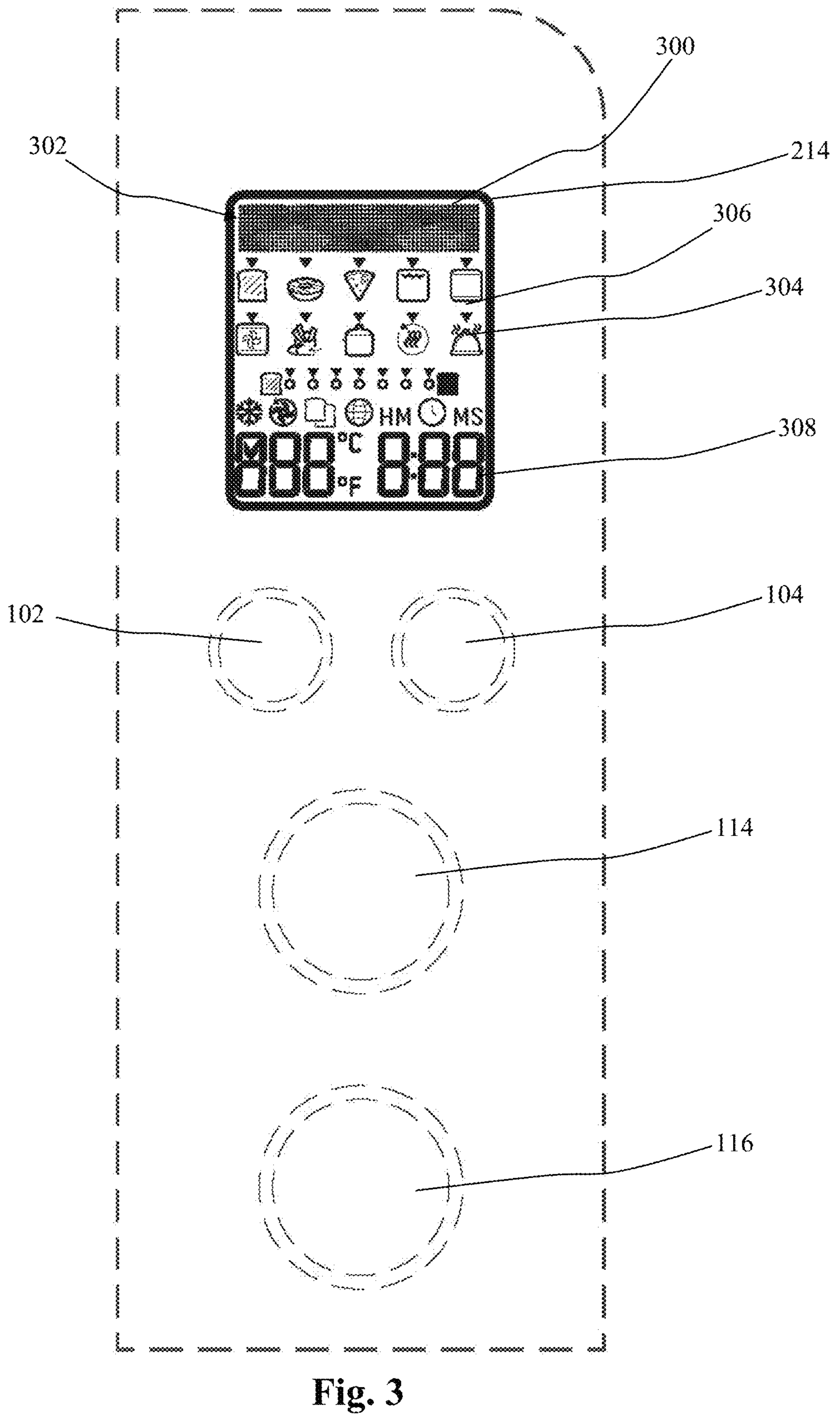
FIG. 3 is a detailed front view of the display assembly of FIG. 1.
Figure 4A:
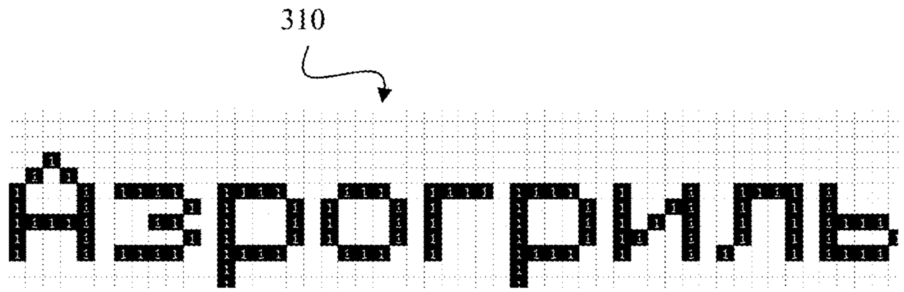
FIG. 4A is a visual representation of a predetermined instruction set used in the display assembly of FIG. 1.
Figure 4B:
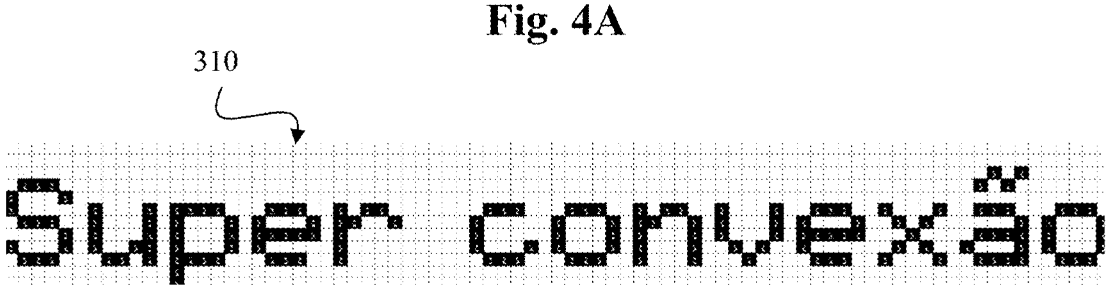
FIG. 4B is a visual representation of a predetermined instruction set used in the display assembly of FIG. 1.
Figure 4C:
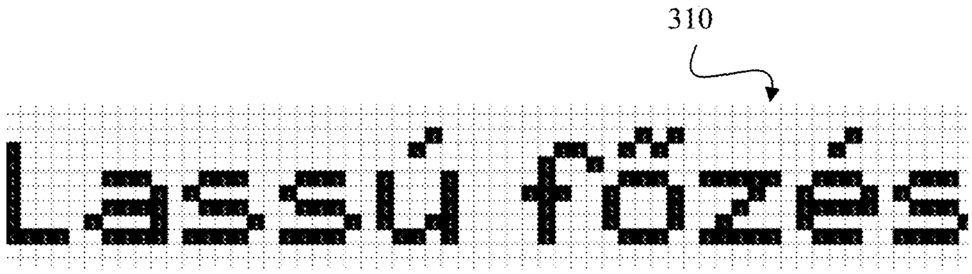
FIG. 4C is a visual representation of a predetermined instruction set used in the display assembly of FIG. 1.
Figure 4D:
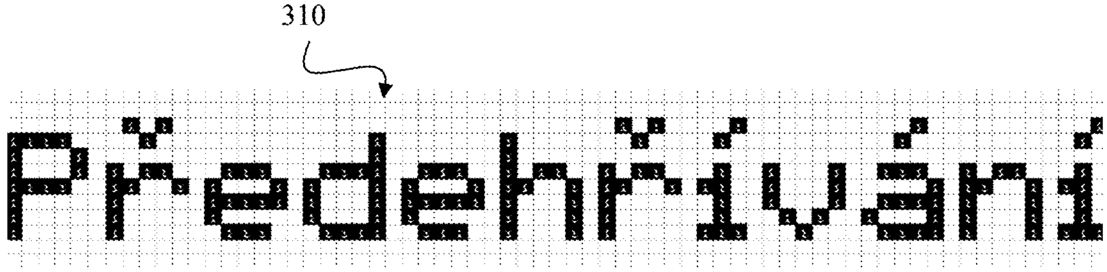
FIG. 4D is a visual representation of a predetermined instruction set used in the display assembly of FIG. 1.

In the preferred embodiment shown in FIG. 3, the display 214 is a liquid crystal display (LCD) panel 214 having a plurality of liquid crystal elements 300 forming a dot matrix 302. The LCD panel 214 further has at least one liquid crystal pictographic element 304. In the preferred embodiment shown in FIG. 3, the LCD panel 214 has a plurality of pictographic elements 304 representative of a state, or desired state, of the kitchen device 100. A selector element 306 is located above each pictographic element 304, alternatively, a single selector element 306 is used in the LCD panel 214 and is moved between a plurality of positions, each pictographic element 304 having a position located above it. The selector element 306 has a triangular shape, with one point of the triangle pointing towards the respective pictographic element 304 with which the selector element 306 is associated. The selector elements 306 are operatively connected to the user input devices 213 such that the activation of a selector element 306 is controlled using the user input devices 213. The LCD panel 214 also has a number of seven-segment arrays 308 adapted to present the digits 0 to 9.

The ROM 260 contains a plurality of predetermined display instruction sets 310 that result in an output on the display 214, examples of which are shown in FIGS. 4A to 4D. Each predetermined instruction set 310, as shown in each of FIGS. 4A to 4D, corresponds to a set of "on" and "off" instructions for each liquid crystal element 300 of the dot matrix 302 to produce an output on the display 214. The processor 202 is adapted to execute the software application program 223 to determine a required output of the dot matrix, for example depending on the selector element 306 that is presently activated due to use of the user input devices 213. Alternatively, or in addition, the required output may be determined on an operational state of the kitchen device 100.

As can be seen in FIGS. 4A to 4D, each of the outputs produced on the display 214 from the predetermined instruction sets 310 is in a different language. Each pictographic element 304 is associatable with a plurality of predetermined instruction sets 310, for example using a VLOOKUP table. In one embodiment, the pictographic element 304 showing a pizza slice may be associatable with predetermined instruction sets 310 that produce an output on the display 214 in the shape of the word "Pizza" in a variety of different languages.

The display assembly 201 may further include a second plurality of liquid crystal elements (not shown) forming a second dot matrix (not shown). The second dot matrix may be located immediately below the dot matrix 302. The processor 202 is adapted to execute the software application program 223 to determine a second required output of the second dot matrix. The determination by the processor 202 may be dependent, for example, on the required output of the dot matrix 302.

Use of the of the display assembly 201 will now be discussed.

To set up the kitchen device 100 for use, an initialisation process must be carried out. The processor 202 is adapted to execute executable instructions contained in the software application program 223 to receive information relating to a geographic location and/or a language preference. The processor 202 is adapted to receive the information by accessing the communication interface 208 to receive geographic location information from a personal computing device (not shown), such as a mobile device (not shown). The processor 202 is also adapted to receive the information by selection of a language preference using the user input devices 213.

Following receipt of the information relating to a geographic location and/or a language preference, the processor 202 is adapted to execute executable instructions contained in the software application program 223 to associate one or more pictographic element 304 with a respective output of the dot matrix 302 on the basis of the information relative to a geographic location and/or a language preference. The processor 202 is also adapted to associate one or more required outputs of the dot matrix 302 with a second corresponding output of the second dot matrix. In an exemplary embodiment, the language preference may be "English".

The display assembly 201 is now initialised such that once the required output of the dot matrix 302 has been determined, the predetermined instruction set 310 associated with the required output may be retrieved by the processor 202 in whole from the ROM 270 to simultaneously operate all liquid crystal elements 300 of the dot matrix 302 according to the predetermined instruction set 310 and produced the required output on the display 214.

Figure 5:
FIG. 5 is a detailed front view of a liquid crystal display panel of the display assembly of FIG. 1.

For example, as shown in FIG. 5, a user may operate the user input device 214 to illuminate the selector element 306 above the pictographic element 304 showing the visual representation of a pizza slice to select the pictographic element 304. The pictographic element 304 "pizza slice" was associated during initialisation with the corresponding output forming the shape of the word "Pizza" on the dot matrix 302. As a result, the processor 202 determines that the required output on the display 214 is the shape of the word "Pizza". The processor 202 then retrieves the predetermined instruction set 310 that corresponds to the required output from the ROM 370 and operates the dot matrix 302 using the predetermined instruction set 310.

Further, the processor 202 is adapted to determine the second required output on the basis of the required output of the dot matrix 302, as the required output of the dot matrix 302 was associated with a second corresponding output in the initialisation process. The processor 202 is adapted to retrieve the predetermined instruction set 310 from the ROM 270 that corresponds to the second required output and operate the liquid crystal elements of the second dot matrix using the predetermined display instruction set.

Figure 6:
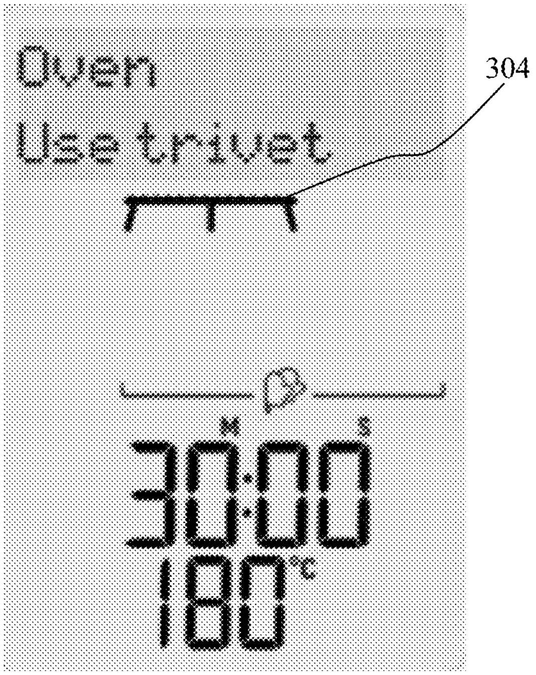
FIG. 6 is a detailed front view of a liquid crystal display panel of the display assembly of FIG. 1.
Figure 7:
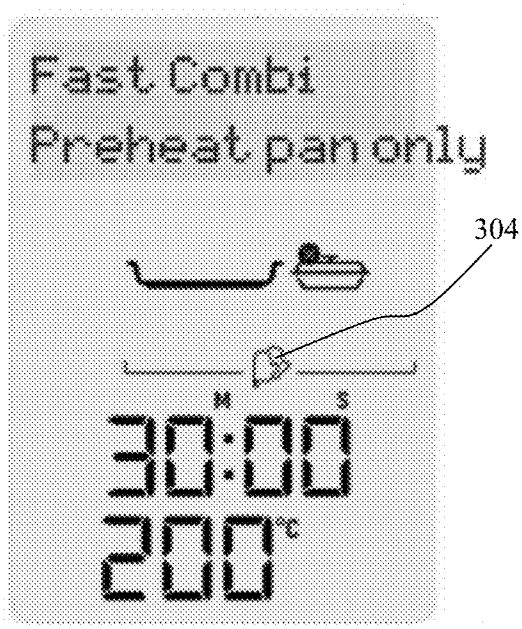
FIG. 7 is a detailed front view of a liquid crystal display panel of the display assembly of FIG. 1.

Yet further, the processor 202 is adapted to operate one or more pictographic elements 304 after another pictographic element 304 has been selected. For example, a selection of the pictographic element 304 corresponding to "toast" may result in the display 214 activating the one or more pictographic elements 304 corresponding to a visual indication of a "shade degree" of a toast. The operation of the one or more pictographic elements 304 corresponding to the visual indication of the "shade degree" of the toast may be controlled by the user input devices 213, such as the rotary selector 114, 116. In another example, a selection of the pictographic element 304 corresponding to "oven" may result in the display 214 activating the pictographic element 304 corresponding to "trivet", as seen in FIG. 6. Further, the selection of the pictographic element 304 may also result in a second required output corresponding to "Use trivet" being retrieved by the processor 202 for operation of the second dot matrix. In yet another embodiment, the processor 202 is adapted to operate one or more pictographic elements 304 after another pictographic element 304 has been selected and the kitchen device 100 has been operated in a heat-generating operation. For example, a selection of the pictographic element 304 corresponding to "oven", and operation of the kitchen device 100 in "oven" operation may result in the display 214 activating the pictographic element 304 corresponding to "oven mitt", as seen in FIG. 7.

In another embodiment of the display assembly 201, the required output may be a function of time. For example, upon selection of a pictographic element 304 the required output may be the shape of the word "Frozen" for two second. After two seconds have elapsed, the required output may be the shape of the word "Heating". The display assembly 201 function substantially similarly, as the processor 202 determines the required output (which may change), retrieves the predetermined display instruction set 310 corresponding to the required output, and operates the dot matrix 302 using the predetermined instruction set 310.

In another embodiment of the display assembly 201, the processor 202 is adapted to execute executable instructions contained in the software application program 223 to associate one or more pictographic elements 304 with a respective output of the dot matrix 302 on the basis of updated information relative to a geographic location and/or a language preference. The processor 202 is adapted to receive the updated information by accessing the communication interface 208 to receive geographic location information from the personal computing device.

Advantages of the display assembly 201 will now be discussed.

Because the display assembly 201 is operate using predetermined display instructions, the precise output of the dot matrix 302 can be predetermined. This enables the precise kerning and graphic design of the output of the dot matrix 302, which can be challenging when manufacturing a product for use in a large plurality of languages. The simple association of required output with a predetermined instruction set 310 also reduces the amount of processing required to produce the required output, as only a single retrieval of the instruction set from the ROM 270 is necessary.

Due to the use of a dot matrix 302 in the display assembly 201, it is possible to manufacture a single display assembly 201 for a plurality of localisation markets. It is also possible to re-localise the kitchen device 100, that is, to switch the language in which the kitchen device 100 operates. This is desirable for, for example, the hospitality industry which may wish to adapt the language of the device for each guest being served.

The invention claimed is:

1. A display assembly for a kitchen device, the display assembly including:
   - a liquid crystal display panel having:
     - a plurality of liquid crystal elements forming a dot matrix display portion; and
     - a plurality of pictographic elements located adjacent the dot matrix display portion, each pictographic element formed of a single liquid crystal element, wherein the liquid crystal display panel further has a selector element associated with and located adjacent each of the pictographic elements;
   - a memory device for storing executable instructions for operating the dot matrix display portion;
   - a processor adapted to execute the executable instructions to:
     - determine a required output of the dot matrix display portion;
     - retrieve a predetermined instruction set from the memory device that corresponds to the required output; and
     - operate the dot matrix display portion using the predetermined instruction set,
   - wherein the predetermined instruction set includes an instruction for each element in the plurality of liquid crystal elements.

2. The display assembly of claim 1, the display assembly further including:
   - a user input device to select the pictographic element,
   - wherein the processor is adapted to associate the pictographic element with a corresponding output of the dot matrix display portion such that, when the pictographic element is selected using the user input device, the processor determines the required output of the dot matrix display portion from the corresponding output.

3. The display assembly of claim 1, wherein the pictographic element is associatable with a plurality of possible corresponding outputs, and wherein the processor is adapted to associate the pictographic element with the corresponding output from the plurality of possible corresponding outputs on the basis of a geographic location of the kitchen device or a user selection.

4. The display assembly of claim 3, wherein the processor is adapted to receive the geographic location and/or the user selection by communicating with a personal computing device.

5. The display assembly of claim 1, wherein the liquid crystal display panel further has:
   - a second plurality of liquid crystal elements forming a second dot matrix display portion;
   - wherein the executable instructions also include executable instructions for operating the second dot matrix display portion and the processor is adapted to execute the executable instructions to:
     - associate the required output of the dot matrix display portion with a second required output of the second dot matrix display portion;
     - determine the second required output of the second dot matrix display portion on the basis of the required output of the dot matrix display portion;
     - retrieve the predetermined instruction set from the memory device that corresponds to the second required output; and operate the second dot matrix display portion using the predetermined instruction set that corresponds to the second required output.

6. The display assembly of claim 1, wherein the processor is adapted to retrieve the predetermined set of instructions from the memory device in a single operation for operation of the dot matrix display portion using the predetermined set of instructions, and wherein the operation of the dot matrix display portion using the predetermined set of instructions operates each liquid crystal element substantially simultaneously.

7. A kitchen device having the display assembly of claim 1.

8. A method of operating a display assembly of a kitchen device having:

a plurality of liquid crystal elements forming a dot matrix display portion, and a plurality of pictographic elements located adjacent the dot matrix display portion, each pictographic element formed of a single liquid crystal element, wherein the display assembly further includes a selector element associated with and located adjacent each of the pictographic elements, the method including the steps of:

determining a required output of the dot matrix display portion;

retrieving a predetermined instruction set from a memory device of the kitchen device that corresponds to the required output; and operating the dot matrix display portion using the predetermined instruction set, wherein the predetermined instruction set includes an instruction for each element in the plurality of liquid crystal elements.

9. The method of claim 8, wherein the display assembly further includes a user input device, and the method further including the steps of:

associating the pictographic element with a corresponding output of the dot matrix display portion; and when the pictographic element is selected using the user input device, determining the required output of the dot matrix display portion from the corresponding output.

10. The method of claim 8, wherein the pictographic element is associatable with a plurality of possible corresponding outputs, and the method further including the step of:

associating the pictographic element with the corresponding output from the plurality of possible corresponding outputs on the basis of a geographic location of the kitchen device or a user selection.

11. The method of claim 10, the method further including the step of:

receiving the geographic location and/or the user selection by communicating with a personal computing device.

12. The method of claim 8, wherein the kitchen device further includes a second plurality of liquid crystal elements forming a second dot matrix display portion, and the method further including the steps of:

associating the required output of the dot matrix display portion with a second required output of the second dot matrix display portion;

determining the second required output of the second dot matrix display portion on the basis of the required output of the dot matrix display portion;

retrieving the predetermined instruction set from the memory device that corresponds to the second required output; and operating the second dot matrix display portion using the predetermined instruction set.

13. A programmable memory device containing executable instructions to carry out the method of claim 8.

* * * * *